United States Patent [19]

Yano

[11] Patent Number: 4,930,202
[45] Date of Patent: Jun. 5, 1990

[54] ROLL WITH A BENT SHAFT

[76] Inventor: Akechi Yano, 2, Kikusuidori 4-chome, Moriguchishi, Osakafu, Japan

[21] Appl. No.: 325,168

[22] Filed: Mar. 17, 1989

[30] Foreign Application Priority Data

Mar. 25, 1988 [JP] Japan .................. 63-73016
Mar. 25, 1988 [JP] Japan .................. 63-73017

[51] Int. Cl.$^5$ .................................... B60B 7/04
[52] U.S. Cl. .................................. 29/116.2; 29/121.6; 29/121.8; 29/122; 29/123; 29/124
[58] Field of Search ............... 29/116.1, 116.2, 121.1, 29/121.6, 121.8, 122, 123, 124, 125, 130, 132

[56] References Cited

U.S. PATENT DOCUMENTS

| | | | |
|---|---|---|---|
| 1,317,713 | 10/1919 | Linder | 29/122 |
| 2,114,378 | 4/1938 | Gundlach | 29/123 X |
| 2,146,670 | 2/1939 | Crockford | 29/130 X |
| 2,562,949 | 8/1951 | Robertson | 29/125 X |
| 2,651,103 | 9/1953 | Hornbostel | 29/123 |
| 2,732,591 | 1/1956 | Whittum | 72/366 X |
| 3,019,511 | 2/1962 | Hornbostel | 29/130 |
| 3,191,263 | 6/1965 | Kuehn | 29/121.6 |
| 3,213,513 | 10/1965 | Robertson | 29/125 X |
| 3,308,519 | 3/1967 | Westgate | 29/125 X |
| 3,786,975 | 1/1974 | Heymanns | 29/125 X |
| 3,831,239 | 8/1974 | Hoff et al. | 29/125 |
| 3,884,623 | 5/1975 | Slack | 29/122 X |
| 4,068,360 | 1/1978 | Freuler | 29/116.2 |
| 4,311,509 | 1/1982 | Reader et al. | 29/116.1 X |
| 4,376,643 | 3/1983 | Kahle et al. | 29/116.1 X |
| 4,601,775 | 7/1986 | Grong | 29/116.1 X |

Primary Examiner—Timothy V. Eley
Assistant Examiner—Frances Chin
Attorney, Agent, or Firm—Armstrong, Nikaido, Marmelstein, Kubovcik & Murray

[57] ABSTRACT

A roll comprises a roller, having the circumference changing in length, mounted on a roller shaft which is bent with a central portion and both outer portions in different plane directions free of load. The roller forms at least one axial flat line along an external periphery while being rotated about the roller shaft. The roll has actions of preventing the object from deviation and expander action. The roll permits stable and high-speed running of an object being carried without causing deformation based on the flat line. The roll can be arranged oppositely in pair to effect uniform pinch pressure in width direction on the object being carried.

9 Claims, 5 Drawing Sheets

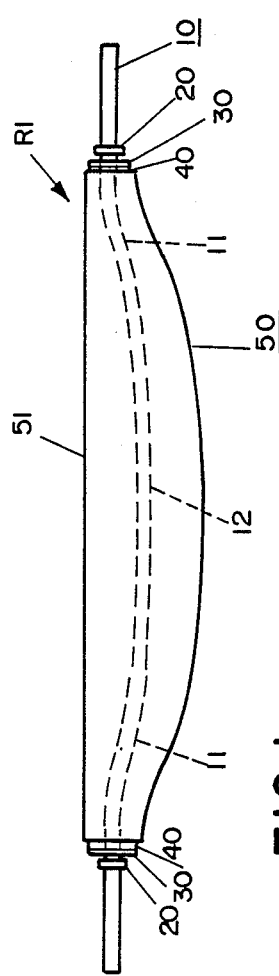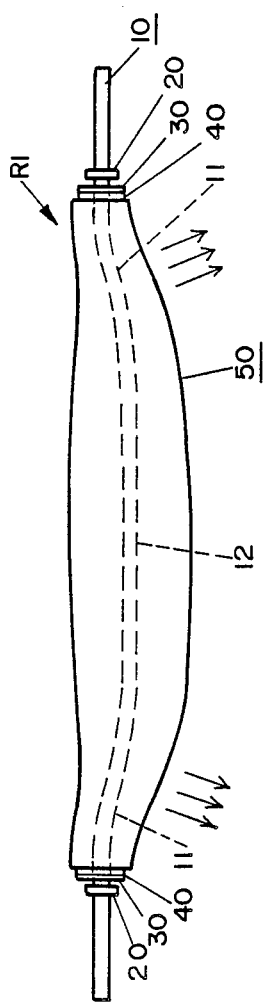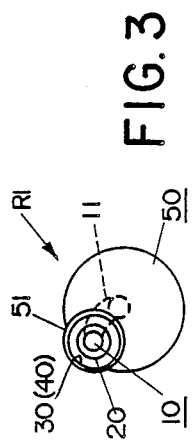

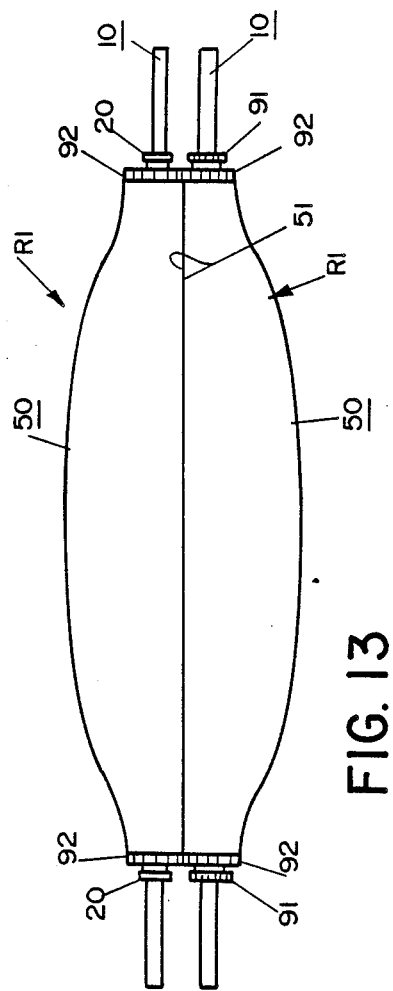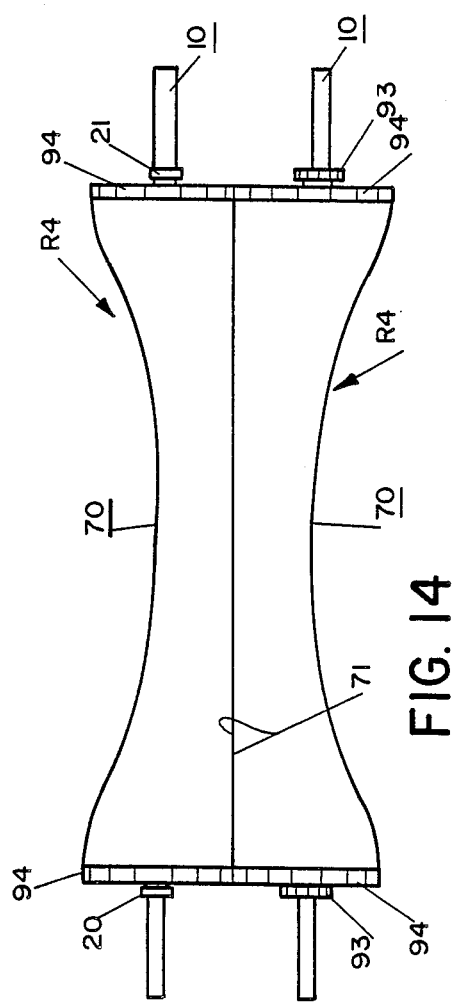

ROLL WITH A BENT SHAFT

BACKGROUND OF THE INVENTION

1. Field of the Invention

The present invention relates to a roll comprising a roller mounted rotatably on a roller shaft. More particularly, it relates to a roll suitable to carrying an object with deviation preventing and expander actions.

2. Statement of Prior Art

An end-slenderized roller with the circumference decreasing toward both ends has action of preventing an object being carried from deviation from the roller surface. On the other hand, an end-thickened roller with the circumference increasing toward both ends has action of expander (U.S. Pat. No. 3,884,623). However changing circumference of a roller causes troubles such as wrinkles on the object being carried when the roller is a end-slenderized one, and deviation of the object from the roller surface when the roller is an end-thickened one. In addition, the curve on the roller surface in the length direction caused by the changing circumference can produce a distortion on the object being carried.

These points are same as for a roll comprising an end-slenderized or an end-thickened roller provided with a roller shaft. As rolls having rollers with changing circumference, known were those using straight roller shafts (U.S. Pat. Nos. 1,317,713, 2,732,591, 4,068,360). These rolls are formed so that the roller rotates together with the roller shaft. It has also been proposed to arrange a pair of rolls having end-slenderized rollers oppositely into pinching system with the straight roller shafts curved by the load in directions opposite to each other. This opposite arrangement, however, can encourage meandering of the object being carried because the contact pressure between the rollers cannot be made constant in the shaft direction.

SUMMARY OF THE INVENTION

It is an object of the present invention to provide a novel roll comprising a roller with the circumference changing in axial direction and rotatably mounted on a roller shaft having the center portion and its both outside portions bent in different plane directions free of load, the roll having deviation preventing and expander actions.

Another object of the present invention is to provide a roll which permit stable and high-speed running of an object being carried, bringing the object in wide contact with the roller surfaces, without distortion of the object.

Still another object of the present invention is to provide a pair of rolls arranged opposite to each other in to a pinching system so that the clearance or contact pressure between the rollers becomes constant in the axial direction.

BRIEF DESCRIPTION OF THE DRAWINGS

FIG. 1 is an elevation showing the roll having an end-slenderized roller forming straight line, of an embodiment according to the present invention, FIG. 2 is a plan view of the roll shown in FIG. 1, FIG. 3 is a left side view of the roll shown in FIG. 1.

FIG. 13 is a front view showing a pair of rolls shown in FIG. 1 arranged opposed in contact with each other at the straight lines they form.

FIG. 14 is a front view showing a pair of rolls shown in FIG. 7 arranged opposed in contact with each other at the straight lines they form.

DETAILED DESCRIPTION OF THE PREFERRED EMBODIMENTS OF THE INVENTION

The roll according to the present invention comprises a roller shaft with a central portion and its both outside portions bent in different plane directions free of load, and a roller mounted rotatably on the roller shaft. The circumference of the roller changes in an axial direction toward both the end portions from the central portion, and the surface layer of the roller deformes with cyclical expansion and contraction in the direction of its width while being rotated about said roller shaft such that at least one axial flat line is defined along an external periphery of said roller. The configuration of the roller includes end-slenderized type where the circumference decreases in the axial direction toward both the end portions from the central portion and end-thickened type where the circumference increases in the axial direction toward both the end portions from the central portion.

The present invention will now be described based on the embodiments shown.

Figure 4:
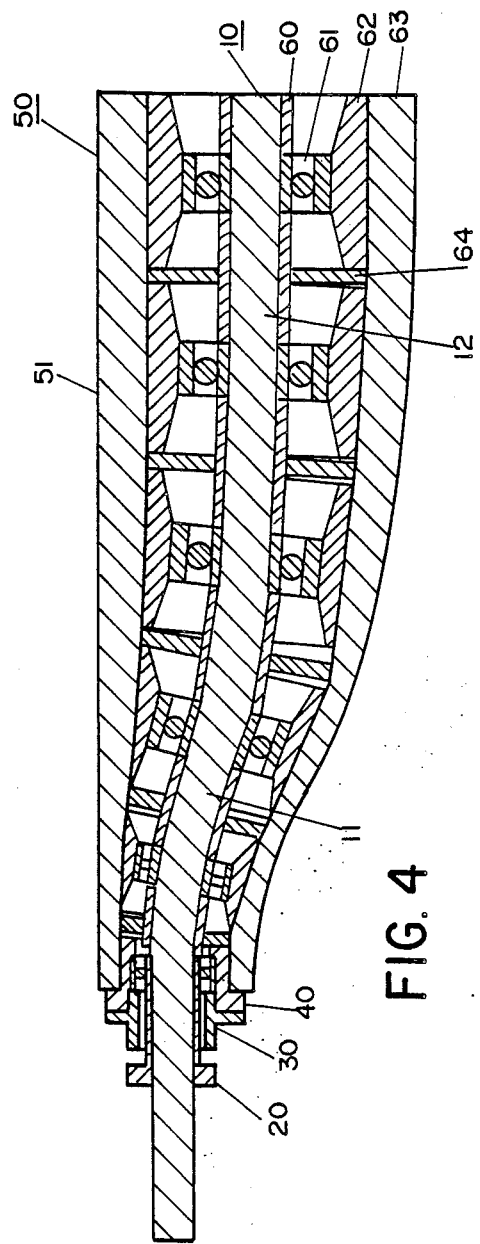
FIG. 4 is an enlarged sectional view of the left portion of the roll shown in FIG. 1.

In FIG. 1, a roll R1 has a roller shaft 10 and a roller 50. As obvious from FIG. 1 (elevation), FIG. 2 (plan view), and FIG. 3 (left side view), the roller shaft 10 has the central portion 12 curved and its both outside portions 11 bent in directions different from the curved plane of the central portion 12. The curve of the central portion 12 and the bent of both the outside portions 11 of the central portion 12 are given in advance. Therefore, the roller shaft 10 is bent in the condition free of load. The roller shaft 10 is formed symmetrically with respect to the center. The roller 50 has an end-slenderized configuration corresponding to the curve of the center portion 12 of the roller shaft. When the roller shaft is set so that the curve of the central portion 12 becomes concave, the upper side 51 of the circumference of the roller 50 forms a straight line along its external periphery. In FIG. 4, the roller 50 is rotatably mounted on the roller shaft 10 through a plurality of cases 62 accomodating bearings 61. The outer layer 63 of the roller 50 is made of rubber and expands and contracts in axial direction as the roller 50 rotates. This makes the rotation of the roller 50 about the roller shaft 10 possible.

In FIG. 4, numeral 40 represents an end flange mounted on an end of the roller. Numeral 30 represents a presser flange attached to the outside of the end flange 40. Numeral 20 represents a set sleeve mounted on the roller shaft 10. The set sleeve 20 positions each sleeve 60. Each sleeve 60 regulates the intervals between bearings 61. Numeral 64 represents rings of equal thickness provided between cases 62.

Figure 5:
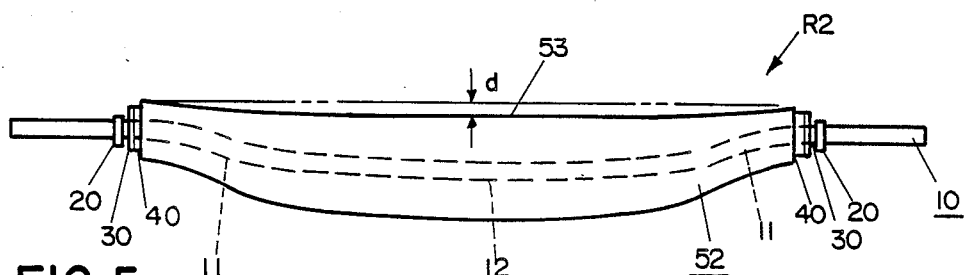
FIG. 5 is an elevation of the roll having an end-slenderized roller forming a concave line, of another embodiment according to the present invention.

In FIG. 5, the roll R2 has an end-slenderized roller 52 which forms slightly concave line in the axial direction with its top portion 53, when the roller shaft 10 is installed with its central portion 12 in concave state. The roller shaft 10 and the internal structure are the same as in the above roll R1 The roll R2 belongs to the concave type.

Figure 6:
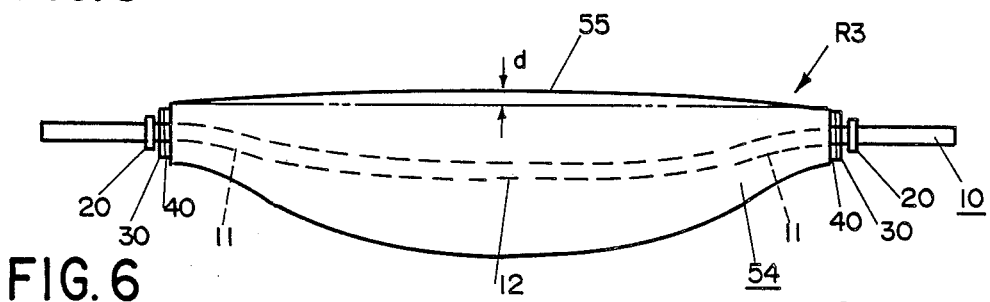
FIG. 6 is an elevation of the roll having an end-slenderized roller forming a convex line, of still another embodiment according to the present invention.

In FIG. 6, the roll R3 has an end-slenderized roller 54 which forms slightly convex line in the axial direction with its top portion 55 when the roller shaft 10 is installed with its central portion 12 in concave state. The roller shaft 10 and the internal structure are the same as in the above roll R1. The roll R3 belongs to the convex type.

Figure 7:
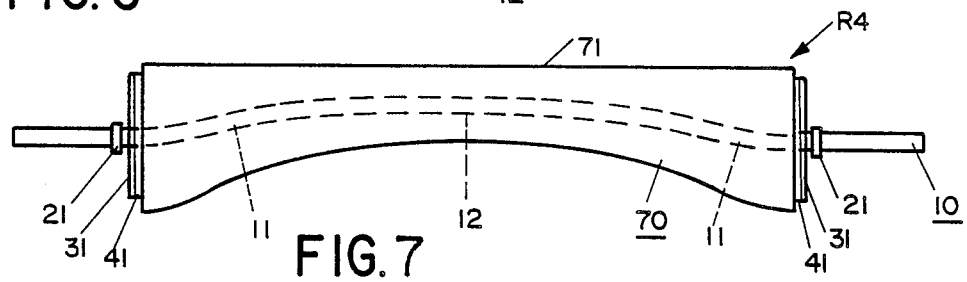
FIG. 7 is an elevation of the roll having an end-thickened roller forming a straight line, of a fourth embodiment according to the present invention.
Figure 9:
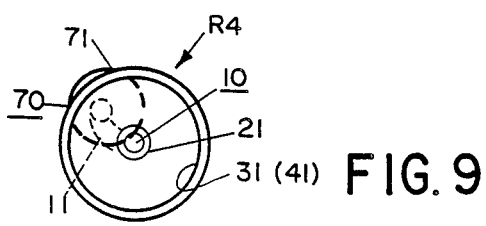
FIG. 9 is a left side view of the roll in FIG. 7.
Figure 10:
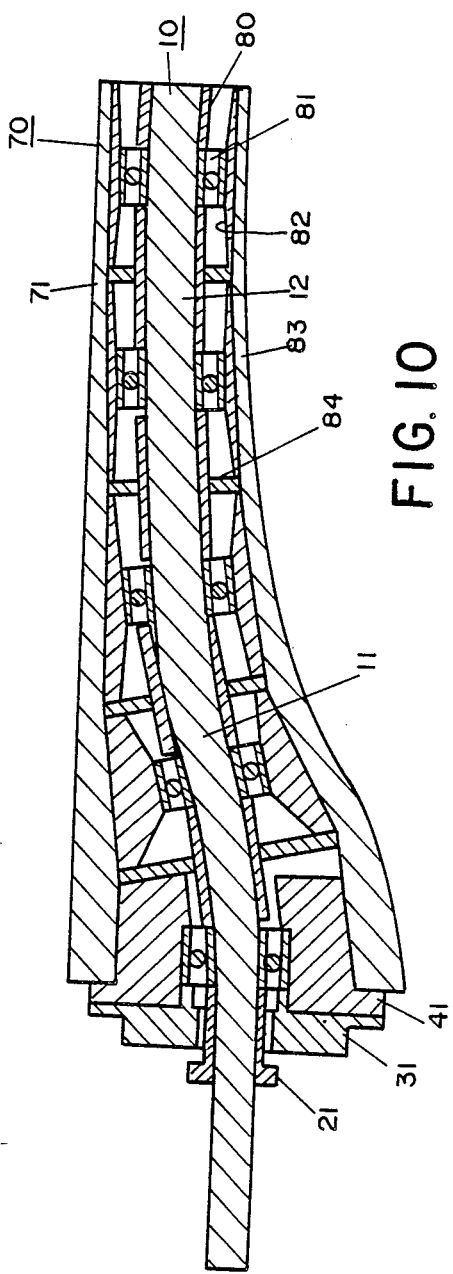
FIG. 10 is an enlarged sectional view of the left portion of the roll in FIG. 7.

In FIG. 7, the roller 70 of roll R4 has an end-thickened configuration corresponding to the curve of the central portion 12 of the roller shaft 10. As obvious from FIG. 7, FIG. 8, and FIG. 9, the roller shaft 10 is the same as that of roll R1. The top portion 71 of the circumference of the roller 70 forms a straight line in the axial direction, when the roller shaft 10 is set so that the curve of the central portion 12 becomes convex. In FIG. 10, the roller 70 is rotatably mounted on the roller shaft 10 through a plurality of cases 82 accommodating bearings 81. The outer layer 83 of the roller 70 is made of rubber and expands and contracts in axial direction as the roller 70 rotates. This makes the rotation of the roller 70 about the roller shaft 10 possible.

In FIG. 10, numeral 41 represents an end flange mounted on an end of the roller. Numeral 31 represents a presser flange attached to the outside of the end flange. Numeral 21 represents a set sleeve mounted on the roller shaft 10. The set sleeve 21 positions each sleeve 80. Each sleeve 80 regulates the intervals between bearings 81. Numeral 84 represents rings of equal thickness provided between cases 82.

Figure 11:
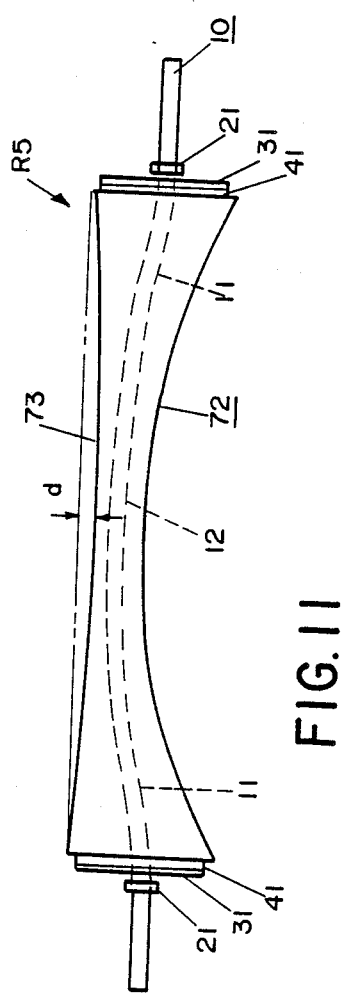
FIG. 11 is an elevation of the roll having an end-thickened roller forming a concave line, of a fifth embodiment according to the present invention.

In FIG. 11, the roll R5 has an end-thickened roller 72 which forms a slightly concave line with its top portion 73 in the axial direction, when the roller shaft 10 is installed with the central portion 12 in convex state. The roller shaft 10 and the internal structure are the same as in the above roll R4. Roll R5 belongs to the concave type.

Figure 12:
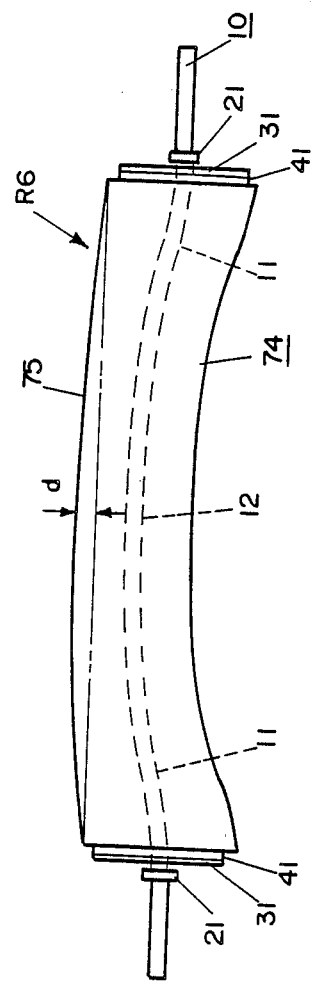
FIG. 12 is an elevation of the roll having an end-thickened roller forming a convex line, of a sixth embodiment according to the present invention.

In FIG. 12, the roll R6 has an end-thickened roller 74, which forms a slightly convex line with its top portion 75 in the axial direction, when the roller shaft 10 is installed with the central portion 12 in convex state. The roller shaft 10 and the internal structure are same as in the above roll R4. Roll R6 belongs to the convex type.

Figure 8:
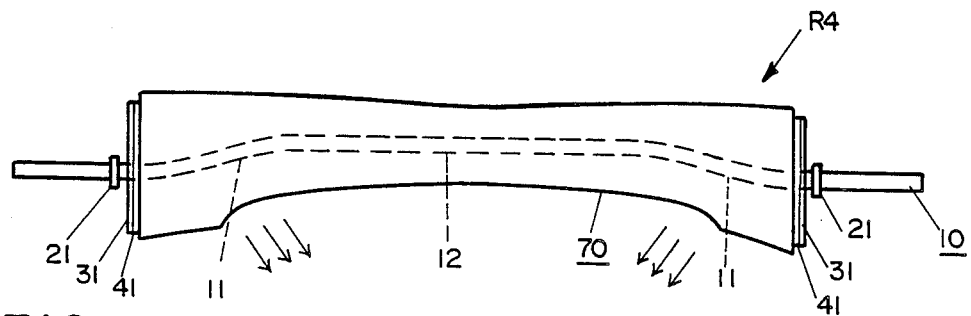
FIG. 8 is a plan view of the roll in FIG. 7.

The roller shaft used in the present invention is bent in its central portion and with both the outside portions of the central portion bent in the direction different from that of the bent plane in the central portion. This bends both the outside portions of the central portion of the roller shaft toward the progressing direction of the carried object (including positive and negative directions). The bent central portion of the roller shaft makes it possible to form a roller having the circumference length changed in axial direction and forming at least one axial flat line along an external periphery. This flat line includes a straight line, a concave line and a convex line as exemplified in the embodiments shown in FIG. 5 and FIG. 11 and in FIG. 6 and FIG. 12. The flat line formed by the circumference of the roller is in a constant position to the roller shaft. It is because the roller which rotates on the roller shaft makes cyclic deformation corresponding to the rotation angle. The formation of the flat line in a constant position on the roller shaft makes it possible to carry the object in wide contact with the roller surface. On the other hand, the bent outside portions of the roller shaft central portion give expander action to the roll having end-slenderized roller and deviation preventive action to the roll having end-thickened roller. This is because, as shown in FIGS. 2 and 8 by the arrows, the force forwarding the object is exerted by both portions of the roller corresponding to the above outside portions of the roller shaft in the direction perpendicular to the component in progressing direction of the object. With the addition of the above action, a roll with either configuration of end-slenderized or end-thickened is provided with both the actions of preventing deviation of the object from roller surface (deviation preventive action) and exerting force extending the width on the object to be carried (expander action).

The bending in the center portion of the roller shaft is allowable, if the roller provided through bearings on the roller shaft, as required, is in the range permitting the rotation of the roller. The degree of bending may be determined depending upon the necessary difference between the circumferences in the center and at the ends of the roller central portion. The difference between the circumferences determines the magnitude of the force preventing the deviation of the object from the roller surface for the roll having end-slenderized roller, and the magnitude of the force in the direction extending the width of the object for the roll having end-thickened roller. The roll having an end-thickened roller according to the present invention can carry an object in wide contact with the roller surface utilizing the flat line of the roller circumference. This permits the use of the roll as a tenter roll, with the action of large force in width-extending direction on the object carried. Generally the degree of bending in the center portion of a roller shaft is 9 mm to 400 m in radius of curvature or 45–179 degrees in open angle. The bending of both the outside portions of the roller shaft central portion can be determined for the roll having end-slenderized roller depending on the force in width extending direction required for preventing or smoothing out wrinkles of the object carried, and for the roll having end-thickened roller depending on the force required for preventing the object to be carried from deviation from the roller surface. Generally, the degree of bending in both the outside portions of the roller shaft central portion is 5 mm to 300 m in radius of curvature or 45–175 degrees in open angle. The above bending of the central portion and its both outside portions of the roller shaft are based on load free conditions.

The length and diameter of the roller shaft are not particularly limited. Generally, a length of 8 mm to 20 m and diameter of 1 mm to 5 m are used. The sectional configuration and the specification are also not limited. In addition to round bar objects, those intended for lighter weight or for higher bending resistance such as a bar object of plates combined so that the section forms radial configuration, the bar object accommodated in a pipe, or those which can cool the roller through the roller shaft, can be used.

In the present invention, the circumference of the roller changes toward both the ends from the center in the axial direction. The end-slenderized section with the circumference length decreasing toward both the ends from the central portion in axial direcion or the end-thickened section with the circumference length increasing is at least formed in the portion of the roller corresponding to the bent central portion of the roller shaft.

The dimensions of the roller are not particularly limited. Generally, a length of 4 mm to 18 m is used. In the end-slenderized portion or end-thickened portion of the roller, the circumference of the maximum-diameter part is 10 mm to 10 m and the difference of the circumference between its central part and end part is 0.5 mm to 1 m. The configuration of the roller mounted rotatably on the roller shaft may form a straight line, concave line, or convex line with the top portion of the roller circumference in the axial direction, in the range that the center line of the center portion of the roller shaft in the shadow-graph projected on a vertical surface is concave for a roll having end-slenderized roller or convex for a roll having end-thickened roller. A roll of concave type forming concave line or a roll of convex type forming convex line offsets the displacement of the roller due to the deflection of the roller shaft and is used advantageously in installation and operation for obtaining a roll for forming straight line in part of the roller circumference. When forming a concave type or convex type roll, the distance (d) of the roller surface at the center of roller in the flat line formed as concave line or convex line from the straight line connecting both the ends of the roller can be set adequately depending upon the degree of deflection of the roller shaft. Generally, it is set to 0.1–50 mm.

The roller is rotatably mounted on the roller shaft. Accordingly, the roller is formed so that at least the surface layer of the roller can extend and contract in the axial direction depending on the angle of rotation when the roller rotates on the roller shaft. The material for forming the roller is, for example, rubber, plastics having rubber-like elasticity, metal having rubber-like elasticity represented by Ni-Ti family alloy and Cu-Zn-Al family alloy, or ceramics having rubber-like elasticity. For preventing slip of the object to be carried, a roller of rubber family is preferably used. When heat resistance is required, a metal family roller or ceramics family roller is preferably used. A metal family roller has also an advantage to retard the attachment of dust due to static electricity based on electric conductivity. The roller may have grooves or projections on its circumference for adequate purposes such as dewatering and preventing slip. The roller may also be covered with coating material such as cloth and sponge.

To rotatably mount the roller on the roller shaft, rotation securing members such as bearings and slide bearings, and rotation assisting members are used as required. For the purpose of enlarging the diameter of the roller or reinforcement, an intermediate member is used between the roller shaft or rotation securing member and the roller surface forming member such as rubber layer. As the intermediate member, those which permits the extension and contraction of the surface layer of the roller, such as bearing case and roller.

The roll according to the present invention is prepared by, for example, the following method: A roller having a rather thicker surface layer with a cutting allowance is rotatably mounted on a roller shaft bent in specified conditions. Then, the roller shaft is horizontally fixed. To obtain a roll having an end-slenderized roller, the roller is set so that the vertical projection of the central portion of the roller shaft shows concave configuration. On the other hand, to obtain a roll having an end-thickened roller, the roller is set so that the vertical projection of the central portion of the roller shaft shows convex configuration. Then, the roller fixed in this condition is cut while being rotated with a cutter set with a specified distance above the roller. Here, with respect to the central portion of the roller shaft, the specified part of the surface layer of the roller sent out successively as the top portion of the roller is cut so that the top portion of the roller successively formed under the rotation of the roller forms a straight line, specified concave line, or specified convex line in the axial direction. On the other hand, with respect to the bent portions on both the outsides of the roller shaft central portion, the roller is cut according to the cutting line in the central portion while sliding the cutter corresponding to the bent portion of the roller shaft so that the cutting position comes just above the roller shaft. By the above preparing method, based on the distance relation between each part of the roller shaft and the cutter, a roll having an end-slenderized or end-thickened roller central portion is formed.

When an object is carried by use of the roll according to the present invention, it is favorable for preventing the production of biased permanent set and for running the object to be carried stably at a high speed in wide contact with the roller surface, to utilize the flat line portion formed in part of the roller circumference in the axial direction, that is, the portion of straight line or nearly straight line in the axial direction. In a roll having an end-slenderized roller, the expander action works when the bent portions on both outsides of the roller shaft central portion proceed the object in the end-slenderized direction as shown in FIG. 2. On the other hand, in a roll having an end-thickened roller, the deviation preventive action works when the bent portions on both outsides of the roller shaft central portion proceeds the object in the direction widening toward the end, as shown in FIG. 8.

Favorable installation method of the roll according to the present invention is to arrange a plurality of, usually a pair of rolls (R1, R4) oppositely into pinch system as shown in FIG. 13 and FIG. 14, and to introduce therebetween an object to be carried. The pinch system prevents more effectively slippage of the object to be carried on the roller surface. The expander action and deviation preventive action based on each roller can be synergistically activated. In forming the pinch system, it is preferable to arrange the pair of rolls so that the flat line in the axial direction of the rollers are set opposite to each other. This makes the clearance or contact pressure between the rollers arranged oppositely uniform over the axial direction, leading to uniform pinch pressure in width direction acting on the object carried.

In FIG. 13 and 14, numerals 92 and 94 represent gears or synchronous rotation fixed to the circumference of the end flanges 40, 41. Numerals 91 and 93 represent gears for transmitting the driving force, fixed to the outside of the gears 92 and 94. In the present invention, gears 92 and 94 can often be omitted. Gears 91 and 93 are provided as required. In the embodiment shown, straight line type roll R1 or roll R4 is used, but the combination of the rolls arranged oppositely is not particularly limited. Adequate combination of straight line type, concave type, and convex type rolls can be used depending upon the purpose such as configuration of opposite portion of rollers and the clearance or contact pressure conditions in each opposite portion of rollers.

The objects to be carried by use of the roll according to the present invention is not particularly limited. Generally, they are film, sheet, plate, tile, and belt.

What is claimed is:

1. A roll for carrying an object comprising:
    a roller shaft being bent free of load, said roller shaft having a curved central portion and having outside portions of said central portion bent in different plane directions from a curved plane of the central portion; and
    a roller mounted to rotate around said roller shaft, said roller having a circumference which changes toward both outside end portions from the central portion, and said roller deforming with cyclical expansion and contraction in a direction of width while being rotated about said roller shaft such that at least one axial flat line is defined along an external periphery of said roller.

2. A roll as defined in claim 1, wherein said circumference of the roller decreases toward both outside end portions from the central portion corresponding to a bend of the central portion of the roller shaft.

3. A roll as defined in claim 1, wherein said circumference of the roller increases toward both end portions from the central portion corresponding to a bend of the central portion of the roller shaft.

4. A roll as defined in claims 1, 2 or 3 wherein said flat line formed along the external periphery of the roller is a straight line.

5. A roll as defined in claims 1, 2, or 3 wherein said flat line formed along the external periphery of the roller is a concave line.

6. A roll as defined in claims 1, 2, or 3 wherein said flat line formed along the external periphery of the roller is a convex line.

7. A roll as defined in claims 1, 2 or 3, wherein a pair of said rolls are arranged opposite to each other into a pinching system and the opposite portion of the rollers in opposite arrangement is said flat lines formed along the external periphery of the roller.

8. A roll as defined in claim 7, wherein said a pair of rolls is the rolls according to claim 4.

9. A roll as defined in claim 7, wherein one of said pair of rolls is the roll wherein said flat line formed along the external periphery of the roller is a concave line and the other is a roll wherein said flat line formed along the external periphery is a convex line.

* * * * *